(12) United States Patent
Horiuchi

(10) Patent No.: US 11,356,036 B2
(45) Date of Patent: *Jun. 7, 2022

(54) POWER CONVERSION APPARATUS, MOTOR MODULE, AND ELECTRIC POWER STEERING APPARATUS

(71) Applicant: Nidec Corporation, Kyoto (JP)

(72) Inventor: Motoki Horiuchi, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 203 days.

This patent is subject to a terminal disclaimer.

(21) Appl. No.: 16/628,707

(22) PCT Filed: Jun. 28, 2018

(86) PCT No.: PCT/JP2018/024662
§ 371 (c)(1),
(2) Date: Jan. 6, 2020

(87) PCT Pub. No.: WO2019/026493
PCT Pub. Date: Feb. 7, 2019

(65) Prior Publication Data
US 2020/0195166 A1    Jun. 18, 2020

(30) Foreign Application Priority Data
Jul. 31, 2017  (JP) .............................. JP2017-148328

(51) Int. Cl.
*H02P 5/00*     (2016.01)
*H02M 7/537*    (2006.01)
(Continued)

(52) U.S. Cl.
CPC ............ *H02M 7/537* (2013.01); *B62D 5/046* (2013.01); *B62D 5/0481* (2013.01); *B62D 6/00* (2013.01);
(Continued)

(58) Field of Classification Search
CPC .......... H02P 6/085; H02P 21/22; H02P 27/08; B62D 5/0484; B62D 6/00; B62D 5/0481;
(Continued)

(56) References Cited

U.S. PATENT DOCUMENTS 8,743,573 B2    6/2014  Balpe
10,093,352 B2   10/2018 Mori et al.
(Continued)

FOREIGN PATENT DOCUMENTS

JP    07-99959 B2      10/1995
JP    2014-192950 A    10/2014

OTHER PUBLICATIONS

Fukunaga et al., "Bus Bar Structure for a Motor", U.S. Appl. No. 14/760,219, filed Jul. 10, 2015.
(Continued)

*Primary Examiner* — Kawing Chan
*Assistant Examiner* — Gabriel Agared
(74) *Attorney, Agent, or Firm* — Keating & Bennett

(57) ABSTRACT

A power conversion apparatus includes a first inverter, a second inverter, a drive circuit to provide control signals turning on low-side switch elements in the first inverter to the low-side switch elements when a failure has occurred on a first inverter side, and provide control signals to turn on low-side switch elements in the second inverter to the low-side switch elements when a failure has occurred on a second inverter side, and a control circuit. When a failure has occurred on the second inverter side, a first power supply voltage generated on the first inverter side is supplied to the drive circuit, while when a failure has occurred on the first inverter side, a second power supply voltage generated on the second inverter side is supplied to the drive circuit.

20 Claims, 12 Drawing Sheets

(51) Int. Cl.
*H02P 21/22* (2016.01)
*B62D 5/04* (2006.01)
*B62D 6/00* (2006.01)
*H02M 7/493* (2007.01)
*H02P 27/08* (2006.01)

(52) U.S. Cl.
CPC ............ *H02M 7/493* (2013.01); *H02P 21/22* (2016.02); *H02P 27/08* (2013.01)

(58) Field of Classification Search
CPC .. B62D 5/046; H02M 7/53871; H02M 7/537; H02M 7/493; H02M 1/32; H02M 1/325; H02M 1/08
USPC .................................................. 318/255, 504
See application file for complete search history.

(56) References Cited

U.S. PATENT DOCUMENTS

| | | | |
|---|---|---|---|
| 2009/0184681 A1* | 7/2009 | Kuno | B60L 53/14 320/128 |
| 2009/0195197 A1* | 8/2009 | Nishimura | B60L 15/025 318/400.09 |
| 2011/0029179 A1* | 2/2011 | Miyazaki | B60L 50/16 701/22 |
| 2011/0199030 A1* | 8/2011 | Suzuki | B62D 5/0481 318/400.3 |
| 2015/0077030 A1* | 3/2015 | Soh | H02P 27/08 318/504 |
| 2016/0006377 A1* | 1/2016 | Hashimoto | B60L 50/62 290/31 |

OTHER PUBLICATIONS

Official Communication issued in International Patent Application No. PCT/JP2018/024662, dated Sep. 25, 2018.

* cited by examiner

POWER CONVERSION APPARATUS, MOTOR MODULE, AND ELECTRIC POWER STEERING APPARATUS

CROSS REFERENCE TO RELATED APPLICATIONS

This is a U.S. national stage of PCT Application No. PCT/JP2018/024662, filed on Jun. 28, 2018, and priority under 35 U.S.C. § 119(a) and 35 U.S.C. § 365(b) is claimed from Japanese Application No. 2017-148328, filed Jul. 31, 2017; the entire disclosures of each of which are hereby incorporated herein by reference.

1. FIELD OF THE INVENTION

The present disclosure relates to a power conversion apparatus that converts power from a power supply to power to be supplied to an electric motor, a motor module, and an electric power steering apparatus.

2. BACKGROUND

Mechatronics motors, in which an electric motor (hereinafter referred to simply as a "motor") and an electrical control unit (ECU) are integrated into a single unit, have been developed in recent years. In particular, in a field of in-vehicle equipment, a high level of quality assurance is required from a safety standpoint. Accordingly, redundant design is often adopted to allow a safe operation to continue even when a failure of a part has occurred. As an example of the redundant design, providing two inverters for one motor has been under study. As another example, providing a backup microcontroller for a main microcontroller has been under study.

A known power conversion apparatus includes a control portion and two inverters, and converts power from a power supply to power to be supplied to a three-phase motor. Each of the two inverters is connected to the power supply and a ground (hereinafter referred to as a "GND"). One of the inverters is connected to ends of windings for three phases of the motor, while the other inverter is connected to other ends of the windings for the three phases. Each inverter has a bridge circuit including three legs each of which includes a high-side switch element and a low-side switch element. The control portion switches motor control from normal-time control to abnormal-time control when a failure has been detected in the switch elements in the two inverters. In the normal-time control, the motor is driven, for example, by switching the states of the switch elements in the two inverters. In the abnormal-time control, the motor is driven, for example, through the normally functioning inverter using a neutral point of the windings in the malfunctioning inverter.

In connection with the above-described related-art technique, there has been a demand for a further improvement of control in the case where a failure has occurred in a peripheral circuit for the inverters. Here, the peripheral circuit is a circuit necessary for driving the inverters, and includes, for example, a controller, a pre-driver, a power supply circuit, and so on, which will be described below. A failure in the peripheral circuit refers to, for example, a failure of the pre-driver or the power supply circuit. In the case of a circuit configuration of the known power conversion apparatus, it is difficult to continue driving of the motor when a failure has occurred in the control portion in addition to a failure in the switch elements in the inverters.

SUMMARY

A power conversion apparatus according to an example embodiment of the present disclosure is a power conversion apparatus that converts power from a power supply to power to be supplied to a motor including windings for n phases, where n is an integer equal to or greater than three. The power conversion apparatus includes a first inverter connected to ends of the windings of respective phases of the motor, and including n legs, each of which includes a low-side switch element and a high-side switch element, a second inverter connected to other ends of the windings of the respective phases, and including n legs, each of which includes a low-side switch element and a high-side switch element, a drive circuit connected to the n low-side switch elements in the first inverter and the n low-side switch elements in the second inverter, to provide control signals that turn on the n low-side switch elements in the first inverter to the n low-side switch elements when a failure has occurred on a first inverter side of the motor, and provide control signals that turn on the n low-side switch elements in the second inverter to the n low-side switch elements when a failure has occurred on a second inverter side of the motor, and a control circuit to control switching operations of the n low-side switch elements and the n high-side switch elements in each of the first inverter and the second inverter, and control the drive circuit. When a failure has occurred on the second inverter side of the motor, a first power supply voltage generated on the first inverter side of the motor is supplied to the drive circuit, while when a failure has occurred on the first inverter side of the motor, a second power supply voltage generated on the second inverter side of the motor is supplied to the drive circuit.

The above and other elements, features, steps, characteristics and advantages of the present disclosure will become more apparent from the following detailed description of the example embodiments with reference to the attached drawings.

DETAILED DESCRIPTION

Hereinafter, power conversion apparatuses, motor modules, and an electric power steering apparatus according to example embodiments of the present disclosure will be described in detail with reference to the accompanying drawings. Note that more detailed descriptions than are necessary may be omitted to prevent the following descriptions from becoming unnecessarily redundant and for easier understanding by those skilled in the art. For example, detailed descriptions of already well-known matters and redundant descriptions of essentially identical features may be omitted.

Example embodiments of the present disclosure will be described herein using, as examples, power conversion apparatuses that convert power from a power supply to power to be supplied to a three-phase motor having windings for three phases (a U phase, a V phase, and a W phase). Note, however, that power conversion apparatuses that convert power from a power supply to power to be supplied to an n-phase motor having windings for n phases (where n is an integer equal to or greater than four), such as, for example, four phases or five phases, also fall within the scope of the present disclosure.

Figure 1:
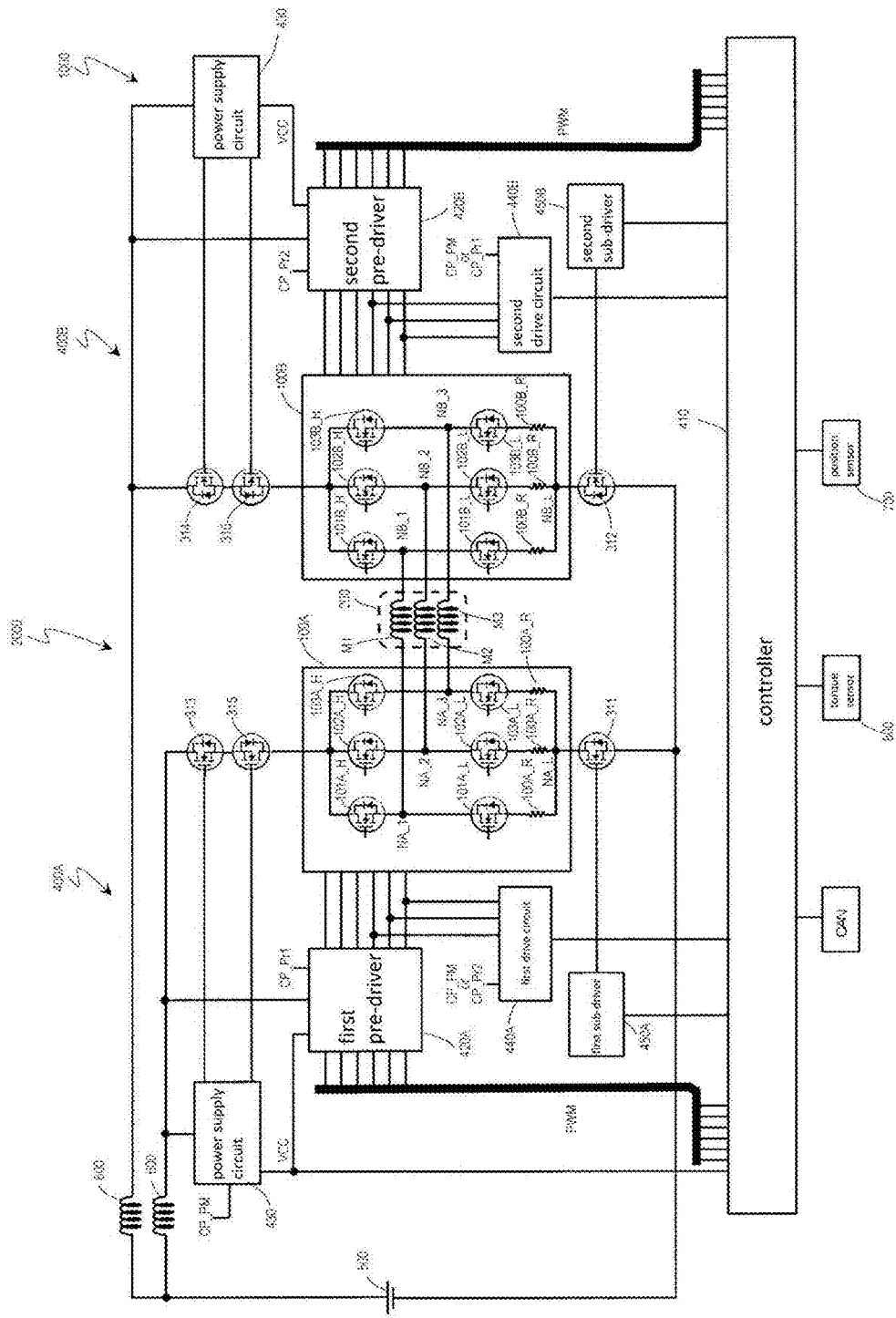
FIG. 1 is a schematic diagram illustrating the block structure of a motor module 2000 according to a first example embodiment of the present disclosure, and illustrating, primarily, the block structure of a power conversion apparatus 1000.

FIG. 1 schematically illustrates the block structure of a motor module 2000 according to a first example embodiment of the present disclosure, and schematically illustrates, primarily, the block structure of a power conversion apparatus 1000. In the present specification, for the sake of convenience in description, constituent elements on the left side of a motor 200 in the block diagram are denoted as a first inverter 100A, a first peripheral circuit 400A, and so on, while constituent elements on the right side of the motor 200 in the block diagram are denoted as a second inverter 100B, a second peripheral circuit 400B, and so on.

The motor module 2000 includes the motor 200 and the power conversion apparatus 1000. The motor module 2000 may be modularized, and may be, for example, produced and sold as a mechatronics motor including a motor, a sensor, a pre-driver, and a controller.

The power conversion apparatus 1000 includes the first inverter 100A, the second inverter 100B, first to sixth switch elements 311, 312, 313, 314, 315, and 316, the first peripheral circuit 400A, the second peripheral circuit 400B, a controller 410, and a power supply circuit 430.

The power conversion apparatus 1000 is connected to the motor 200, and is also connected to a power supply 500 through coils 600. The power conversion apparatus 1000 is capable of converting power from the power supply 500 to power to be supplied to the motor 200. For example, the first inverter 100A and the second inverter 100B are capable of converting direct-current power to three-phase alternating-current power in the form of pseudo sine waves for the U phase, the V phase, and the W phase.

The motor 200 is, for example, a three-phase alternating-current motor. The motor 200 includes a winding M1 for the U phase, a winding M2 for the V phase, and a winding M3 for the W phase, and is connected to the first inverter 100A and the second inverter 100B. More specifically, the first inverter 100A is connected to ends of the windings for the respective phases of the motor 200, while the second inverter 100B is connected to other ends of the windings for the respective phases. This form of motor connection is different from the so-called star connection and the so-called delta connection. It is assumed herein that "connection" between parts (constituent elements) primarily refers to electrical connection.

The first inverter 100A includes three legs each of which includes a low-side switch element and a high-side switch element. A U-phase leg includes a low-side switch element 101A_L and a high-side switch element 101A_H. A V-phase leg includes a low-side switch element 102A_L and a high-side switch element 102A_H. A W-phase leg includes a low-side switch element 103A_L and a high-side switch element 103A_H.

As each switch element, a field-effect transistor (typically, a MOSFET) having a parasitic diode formed therein, or a combination of an insulated-gate bipolar transistor (IGBT) and a reflux diode connected in parallel, can be used, for example. Hereinafter, an example case where a MOSFET is used as each switch element is described, and the switch element will sometimes be denoted as a SW. For example, the switch elements 101A_L, 102A_L, and 103A_L will be denoted as SWs 101A_L, 102A_L, and 103A_L, respectively.

The first inverter 100A includes three shunt resistors 100A_R for electric current sensors for sensing electric currents passing in the windings for the U phase, the V phase, and the W phase, respectively. Each electric current sensor includes an electric current sensing circuit (not shown) for sensing an electric current passing through the corresponding shunt resistor. As illustrated in the figure, each of the three shunt resistors 100A_R is connected, for example, between a GND and a corresponding one of the three low-side switch elements included in the three legs of the first inverter 100A. Each shunt resistor has a resistance value in the range of, for example, about 0.5 mΩ to about 1.0 mΩ.

Similarly to the first inverter 100A, the second inverter 100B includes three legs each of which includes a low-side switch element and a high-side switch element. A U-phase leg includes a low-side switch element 101B_L and a high-side switch element 101B_H. A V-phase leg includes a low-side switch element 102B_L and a high-side switch element 102B_H. A W-phase leg includes a low-side switch element 103B_L and a high-side switch element 103B_H. In addition, the second inverter 100B includes three shunt resistors 100B R. Each of these shunt resistors is connected between the GND and a corresponding one of the three low-side switch elements included in the three legs.

The number of shunt resistors included in each of the inverters is not limited to three. For example, two shunt resistors for the U phase and the V phase, two shunt resistors for the V phase and the W phase, or two shunt resistors for the U phase and the W phase may be used. The number of shunt resistors used and the arrangement of the shunt resistors are appropriately determined with a product cost, design specifications, and so on taken into account.

In the power conversion apparatus 1000, the first inverter 100A and the second inverter 100B can be electrically connected to the power supply 500 and the GND through the first to fourth switch elements 311, 312, 313, and 314. Specifically, the first switch element 311 is arranged to switch the state of connection between the first inverter 100A and the GND (i.e., between an ON state and an OFF state). The second switch element 312 is arranged to switch the state of connection between the second inverter 100B and the GND. The third switch element 313 is arranged to switch the state of connection between the power supply 500 and the first inverter 100A. The fourth switch element 314 is arranged to switch the state of connection between the power supply 500 and the second inverter 100B.

Each of the first to fourth switch elements 311, 312, 313, and 314 is capable of interrupting an electric current passing in either direction. As each of the first to fourth switch elements 311, 312, 313, and 314, a semiconductor switch, such as a thyristor, an analog switch IC, or a MOSFET, a mechanical relay, or the like, for example, can be used. Alternatively, a combination of, for example, a diode and an IGBT may be used. In the present specification, the first to fourth switch elements 311, 312, 313, and 314 will sometimes be denoted as SWs 311, 312, 313, and 314, respectively. It is assumed in the following description that each of the SWs 311, 312, 313, and 314 is a MOSFET.

The SW 311 is arranged such that a forward current will pass through an internal parasitic diode toward the first inverter 100A. The SW 312 is arranged such that a forward current will pass through a parasitic diode toward the second inverter 100B. The SW 313 is arranged such that a forward current will pass through a parasitic diode toward the power supply 500. The SW 314 is arranged such that a forward current will pass through a parasitic diode toward the power supply 500.

As illustrated in the figure, the power conversion apparatus 1000 may further include the fifth and sixth switch elements 315 and 316 for protection against reverse connection. Each of the fifth and sixth switch elements 315 and 316 is typically a MOSFET semiconductor switch including a parasitic diode. The fifth switch element 315 is connected in series with the SW 313, and is arranged such that a forward current will pass through the parasitic diode toward the first inverter 100A. The sixth switch element 316 is connected in series with the SW 314, and is arranged such that a forward current will pass through the parasitic diode toward the second inverter 100B. Even if the power supply 500 is reversely connected, the two switch elements for protection against reverse connection will interrupt a reverse electric current.

The number of switch elements used is not limited to the illustrated example, but is appropriately determined with the design specifications and so on taken into account. In particular, in a field of in-vehicle equipment, a high level of quality assurance is required from a safety standpoint, and it is accordingly preferable that a plurality of switch elements are provided for each inverter.

The power supply 500 generates a predetermined power supply voltage (e.g., 12 V). For example, a direct-current power supply is used as the power supply 500. Note that the power supply 500 may alternatively be an AC-DC converter, a DC-DC converter, or a battery (storage battery).

The power supply 500 may be a single power supply commonly used for the first inverter 100A and the second inverter 100B as illustrated in the figure, or alternatively, a first power supply used for the first inverter 100A and a second power supply used for the second inverter 100B may be provided.

The coil 600 is provided between the power supply 500 and each of the inverters of the power conversion apparatus 1000. The coil 600 functions as a noise filter, and smoothes high-frequency noise included in a voltage waveform supplied to the corresponding inverter, or smoothes high-frequency noise generated in the corresponding inverter to prevent the high-frequency noise from being discharged toward the power supply 500.

A capacitor (not shown) is connected to a power supply terminal of each inverter. The capacitor is a so-called bypass capacitor, and reduces voltage ripple. The capacitor is, for example, an electrolytic capacitor, and the number of capacitors used and the capacitance of each capacitor are appropriately determined on the basis of the design specifications and so on.

The first peripheral circuit 400A is a circuit for controlling an operation of the first inverter 100A. The first peripheral circuit 400A includes, for example, a first pre-driver 420A, a first drive circuit 440A, and a first sub-driver 450A.

The second peripheral circuit 400B is a circuit for controlling an operation of the second inverter 100B. Similarly to the first peripheral circuit 400A, the second peripheral circuit 400B includes, for example, a second pre-driver 420B, a second drive circuit 440B, and a second sub-driver 450B.

The second peripheral circuit 400B typically has substantially the same structure and functions as those of the first peripheral circuit 400A. In more detail, corresponding parts of the first peripheral circuit 400A and the second peripheral circuit 400B have substantially the same structures and functions.

The controller 410 is an integrated circuit for controlling the whole power conversion apparatus 1000, and is, for example, a microcontroller or a field-programmable gate array (FPGA).

The controller 410 controls the first peripheral circuit 400A and the second peripheral circuit 400B. Specifically, the controller 410 controls switching operations of the three low-side switch elements and the three high-side switch elements in each of the first inverter 100A and the second inverter 100B. For example, the controller 410 controls the first drive circuit 440A when a failure of the first pre-driver 420A has occurred, and controls the second drive circuit 440B when a failure of the second pre-driver 420B has occurred.

The controller 410 is capable of realizing closed loop control by controlling the position and rotation speed of a rotor of the target motor 200, electric currents, and so on. Accordingly, the controller 410 typically includes an input port to which an output signal from a position sensor 700 that senses the position of the rotor is inputted.

The position sensor 700 is implemented by, for example, a resolver, a Hall IC, or a combination of a sensor magnet and an MR sensor including a magnetoresistive (MR) element. The position sensor 700 senses the position of the rotor (hereinafter referred to as a "rotation signal"), and outputs the rotation signal to the controller 410.

The controller 410 may include, in place of the input port for the position sensor 700 or together with this input port, an input port to which an output signal from a torque sensor 800 is inputted. In this case, the controller 410 is capable of controlling a target motor torque. In addition, the controller 410 may include a dedicated port for connection with an in-vehicle control area network (CAN), for example.

In view of the redundancy of sensors, for example, two of the position sensors 700 and two of the torque sensors 800 (see FIG. 4) may be provided. In this case, even if a failure of one of the two sensors occurs, it is possible to continue motor control using the other, normally functioning sensor.

The controller 410 may further include an input port to which an electric current signal outputted from each of the aforementioned electric current sensors is inputted. The controller 410 may receive, as an actual electric current value, either a digital signal obtained by conversion by an external analog-to-digital (AD) converter, or an analog signal as it is from the electric current sensor, and the analog signal may be converted to a digital signal in the controller 410.

The controller 410 generates pulse width modulation (PWM) signals, setting target electric current values in accordance with, for example, actual electric current values and the rotation signal of the rotor, and outputs the PWM signals to the first pre-driver 420A and the second pre-driver 420B. In addition, in the present example embodiment, the controller 410 outputs a control signal for controlling the state (ON/OFF) of the SW 311 to the first sub-driver 450A, and outputs a control signal for controlling the state (ON/OFF) of the SW 312 to the second sub-driver 450B.

Pre-drivers are also called gate drivers. A wide variety of general-purpose pre-drivers can be used as the first pre-driver 420A and the second pre-driver 420B.

The first pre-driver 420A is connected between the controller 410 and the first inverter 100A. The first pre-driver 420A generates, under control of the controller 410, control signals for controlling the switching operations of the three low-side switch elements and the three high-side switch elements in the first inverter 100A, and provides the control signals to the respective switch elements. Specifically, the first pre-driver 420A generates a control signal (i.e., a gate control signal) for controlling the switching operation of each of the SWs in the first inverter 100A in accordance with the PWM signal from the controller 410, and provides the control signal to a gate of the SW.

The second pre-driver 420B is connected between the controller 410 and the second inverter 100B. The second pre-driver 420B generates, under control of the controller 410, control signals for controlling the switching operations of the three low-side switch elements and the three high-side switch elements in the second inverter 100B, and provides the control signals to the respective switch elements. Specifically, the second pre-driver 420B generates a gate control signal for controlling the switching operation of each of the SWs in the second inverter 100B in accordance with the PWM signal from the controller 410, and provides the control signal to a gate of the SW.

The first pre-driver 410A is capable of generating a voltage CP_Pr1 higher than the voltage (e.g., 12 V) of the power supply 500. The second pre-driver 410B is capable of generating a voltage CP_Pr2 higher than the voltage of the power supply 500. Each of the stepped-up voltages CP_Pr1 and CP_Pr2 is, for example, 18 V or 24 V. Each pre-driver is of a charge-pump type.

In the present example embodiment, the power supply circuit 430 is a power supply circuit commonly used for the first peripheral circuit 400A and the second peripheral circuit 400B, and is, for example, a power supply IC. Power of, for example, 12 V is supplied from the power supply 500 to the power supply circuit 430. The power supply circuit 430 supplies, to each of blocks of the first peripheral circuit 400A and the second peripheral circuit 400B, a power supply voltage necessary for that block. While the power supply circuit 430 is represented as two functional blocks in FIG. 1, the two functional blocks are not intended to represent separate power supply circuits physically separated.

The power supply circuit 430 supplies a power supply voltage VCC of, for example, 5.0 V or 3.3 V to each of the controller 410, the first pre-driver 420A, and the second pre-driver 420B. In the present example embodiment, the power supply circuit 430 is capable of providing, to each of the SWs 313, 314, 315, and 316, a control signal for controlling the state (ON/OFF) thereof.

The power supply circuit 430 is capable of generating a voltage CP_PM higher than the voltage of the power supply 500. The stepped-up voltage CP_PM is, for example, 18 V or 24 V.

In the present example embodiment, voltages higher than the voltage of the power supply 500 are required. Accordingly, such high voltages are generated using the first pre-driver 420A, the second pre-driver 420B, and the power supply circuit 430 as described above. At least one block that steps up the voltage of the power supply 500 is provided in each of the peripheral circuits.

Here, before the first drive circuit 440A and the second drive circuit 440B are described, the gate control signals generated by the first pre-driver 420A and the second pre-driver 420B will now be described below. The gate control signals will be described below taking the case of the first pre-driver 420A.

In the present specification, control of the power conversion apparatus 1000 which is performed when a failure has not occurred in the power conversion apparatus 1000 is referred to as "normal-time control," while control thereof which is performed when a failure has occurred therein is referred to as "abnormal-time control."

In the normal-time control, each of the SWs 311, 312, 313, 314, 315, and 316 is in the ON state. Accordingly, the potential of a node NA_L at which the SWs 101A_L, 102A_L, and 103A_L in the first inverter 100A are connected is equal to a GND potential. Therefore, a reference potential of the gate of each of the SWs 101A_L, 102A_L, and 103A_L, i.e., a source potential, is low. In this case, the voltage level of the gate control signal to be provided to the gate of each of the SWs may be relatively low, allowing the switching operation of each low-side switch element to be controlled without a problem. Hereinafter, the voltage of the gate control signal will sometimes be referred to as a "gate voltage."

On the other hand, a reference potential of each of the three SWs 101A_H, 102A_H, and 103A_H in the first inverter 100A is high, being equal to a potential of each of nodes NA_1, NA_2, and NA_3 between the low-side switch elements and the high-side switch elements, i.e., a drive voltage supplied to the windings M1, M2, and M3 for the respective phases. To turn on each of the high-side switch elements, a gate voltage higher than a gate voltage to be applied to each of the low-side switch elements needs to be applied to the high-side switch element.

As described above, the first pre-driver 420A is capable of generating a voltage of 18 V by stepping up the voltage of 12 V, for example, and applying the high voltage to each of the SWs 101A_H, 102A_H, and 103A_H. This makes it possible to properly turn on each of the high-side switch elements in a switching operation. Thus, in the normal-time control, the first pre-driver 420A applies, to each of the high-side switch elements, a gate voltage higher than the gate voltage to be applied to each of the low-side switch elements. The gate voltage to be applied to each of the low-side switch elements is, for example, 12 V, while the gate voltage to be applied to each of the high-side switch elements is, for example, 18 V.

A case where a failure has occurred in the power conversion apparatus 1000 will now be considered. The term "failure" primarily refers to a failure that occurs in a peripheral circuit. A failure occurring on the first inverter 100A side of the motor 200 refers to a failure occurring in the first peripheral circuit 400A, and, more specifically, refers to, for example, a failure occurring in the first pre-driver 420A, causing the first pre-driver 420A to become inoperative. A failure occurring on the second inverter 100B side refers to a failure occurring in the second peripheral circuit 400B, and, more specifically, refers to, for example, a failure occurring in the second pre-driver 420B, causing the second pre-driver 420B to become inoperative.

Suppose, for example, that a failure of the first pre-driver 420A has occurred. In this case, the first pre-driver 420A naturally becomes incapable of driving the first inverter 100A under control of the controller 410. However, if the node NA_L on a low side in the first inverter 100A can be caused to function as a neutral point, it is possible to continue to drive the motor 200 by driving the second inverter 100B using this neutral point.

In the present example embodiment, when a failure of the first pre-driver 420A has occurred, for example, the node NA_L on the low side of the first inverter 100A is caused to function as the neutral point. At this time, the controller 410 turns off the first switch element 311 to allow appropriate electric current control. Thus, the neutral point is electrically separated from the GND. As a result, the potential of the node NA_L on the low side ceases to be equal to the GND potential, and becomes higher than the GND potential. In other words, the reference potential of the gate of each of the SWs 101A_L, 102A_L, and 103A_L enters a floating state. If, in this condition, a gate voltage of a magnitude equal to that of the gate voltage (e.g., 12 V) in the normal-time control is applied to each of the low-side switch elements, a gate-source voltage becomes lower than that in the normal-time control.

If the gate-source voltage becomes low, the value of ON resistance between a source and a drain of each of the SWs 101A_L, 102A_L, and 103A_L may increase, or each of the SWs 101A_L, 102A_L, and 103A_L may inadvertently enter the OFF state. To cause the node NA_L on the low side of the first inverter 100A to function as the neutral point, it is necessary to properly keep each of the SWs 101A_L, 102A_L, and 103A_L in the ON state. Accordingly, the gate voltage to be applied to each of the SWs 101A_L, 102A_L, and 103A_L needs to be higher than that in the normal-time control.

In view of the above problem, the power conversion apparatus 1000 according to an example embodiment of the present disclosure includes the first drive circuit 440A and the second drive circuit 440B. The circuit configuration and function of the second drive circuit 440B are substantially the same as those of the first drive circuit 440A, and therefore, the circuit configuration and function thereof will primarily be described below taking the case of the first drive circuit 440A.

The first drive circuit 440A is connected to the three low-side switch elements in the first inverter 100A. The first drive circuit 440A is a dedicated drive circuit used to keep each of the SWs 101A_L, 102A_L, and 103A_L in the first inverter 100A in the ON state at all times when a failure has occurred on the first inverter 100A side of the motor 200. The first drive circuit 440A enables the node NA_L on the low side of the first inverter 100A to properly function as the neutral point.

The second drive circuit 440B is connected to the three low-side switch elements in the second inverter 100B. The second drive circuit 440B is a dedicated drive circuit used to keep each of the SWs 101B_L, 102B_L, and 103B_L in the second inverter 100B in the ON state at all times when a failure has occurred on the second inverter 100B side of the motor 200. The second drive circuit 440B enables a node NB_L on the low side of the second inverter 100B to properly function as a neutral point.

In the normal-time control, the gate control signals for the low-side switch elements are supplied from the first pre-driver 420A to the SWs 101A_L, 102A_L, and 103A_L. In the abnormal-time control, the gate control signals are supplied from the first drive circuit 440A to the SWs 101A_L, 102A_L, and 103A_L.

The voltage level of each of the control signals provided by the first drive circuit 440A to the three low-side switch elements in the first inverter 100A is higher than the voltage level of each of the control signals provided by the first pre-driver 420A to those low-side switch elements. In the present example embodiment, the voltage level of each of the control signals provided by the first drive circuit 440A to the three low-side switch elements in the first inverter 100A is equal to the voltage level of each of the control signals provided by the first pre-driver 420A to the three high-side switch elements in the first inverter 100A. This gate voltage is, for example, 18 V.

The voltage level of each of the control signals provided by the second drive circuit 440B to the three low-side switch elements in the second inverter 100B is higher than the voltage level of each of the control signals provided by the second pre-driver 420B to those low-side switch elements. In the present example embodiment, the voltage level of each of the control signals provided by the second drive circuit 440B to the three low-side switch elements in the second inverter 100B is equal to the voltage level of each of the control signals provided by the second pre-driver 420B to the three high-side switch elements in the second inverter 100B. This gate voltage is, for example, 18 V.

When a failure has occurred on the second inverter 100B side of the motor 200, a first power supply voltage generated on the first inverter 100A side is supplied to the second drive circuit 440B. The voltage generated on the first inverter 100A side refers to a power supply voltage generated in the first peripheral circuit 400A. The first power supply voltage is, for example, the stepped-up voltage CP_Pr1 generated by the first pre-driver 420A. The magnitude of the first power supply voltage is greater than the voltage of the power supply 500, and is, for example, 18 V.

When a failure has occurred on the first inverter 100A side, a second power supply voltage generated on the second inverter 100B side is supplied to the first drive circuit 440A. The voltage generated on the second inverter 100B side refers to a power supply voltage generated in the second peripheral circuit 400B. The second power supply voltage is, for example, the stepped-up voltage CP_Pr2 generated by the second pre-driver 420B. The magnitude of the second power supply voltage is greater than the voltage of the power supply 500, and is, for example, 18 V. In the present example embodiment, the magnitude of the first power supply voltage is equal to the magnitude of the second power supply voltage.

Each of the first power supply voltage and the second power supply voltage may alternatively be the stepped-up voltage CP_PM generated by the power supply circuit 430. When a failure of the first pre-driver 420A has occurred, for example, the stepped-up voltage CP_PM may be supplied to the first drive circuit 440A as the second power supply voltage. When a failure of the second pre-driver 420B has occurred, for example, the stepped-up voltage CP_PM may be supplied to the second drive circuit 440B as the first power supply voltage.

When a failure has occurred on the first inverter 100A side of the motor 200, the first drive circuit 440A provides the control signals for turning on the three low-side switch elements in the first inverter 100A to those low-side switch elements with supply of the second power supply voltage. When a failure has occurred on the second inverter 100B side, the second drive circuit 440B provides the control signals for turning on the three low-side switch elements in the second inverter 100B to those low-side switch elements with supply of the first power supply voltage.

Figure 2A:
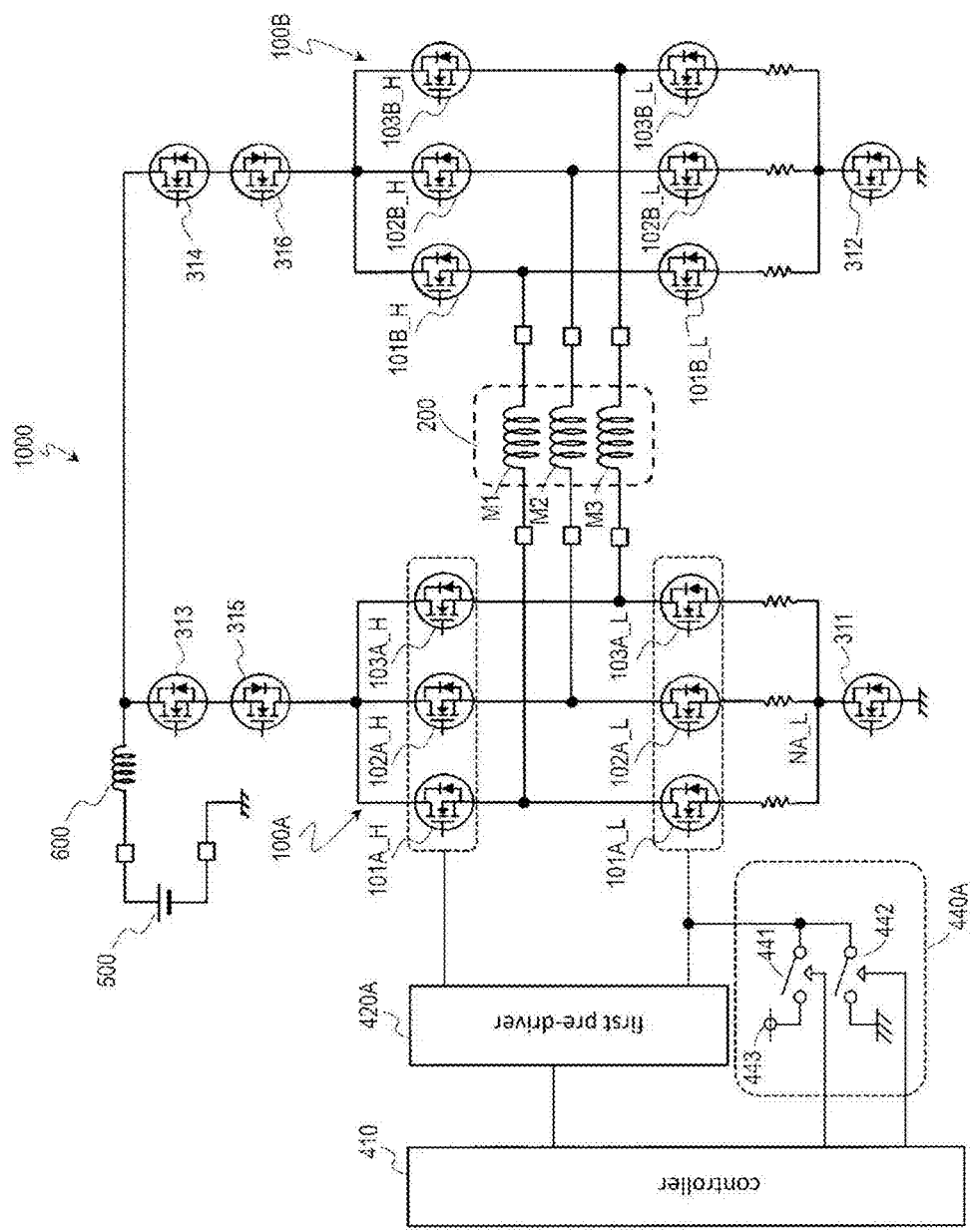
FIG. 2A is a block diagram illustrating functional blocks of a first drive circuit 440A according to an example embodiment of the present disclosure.
Figure 2B:
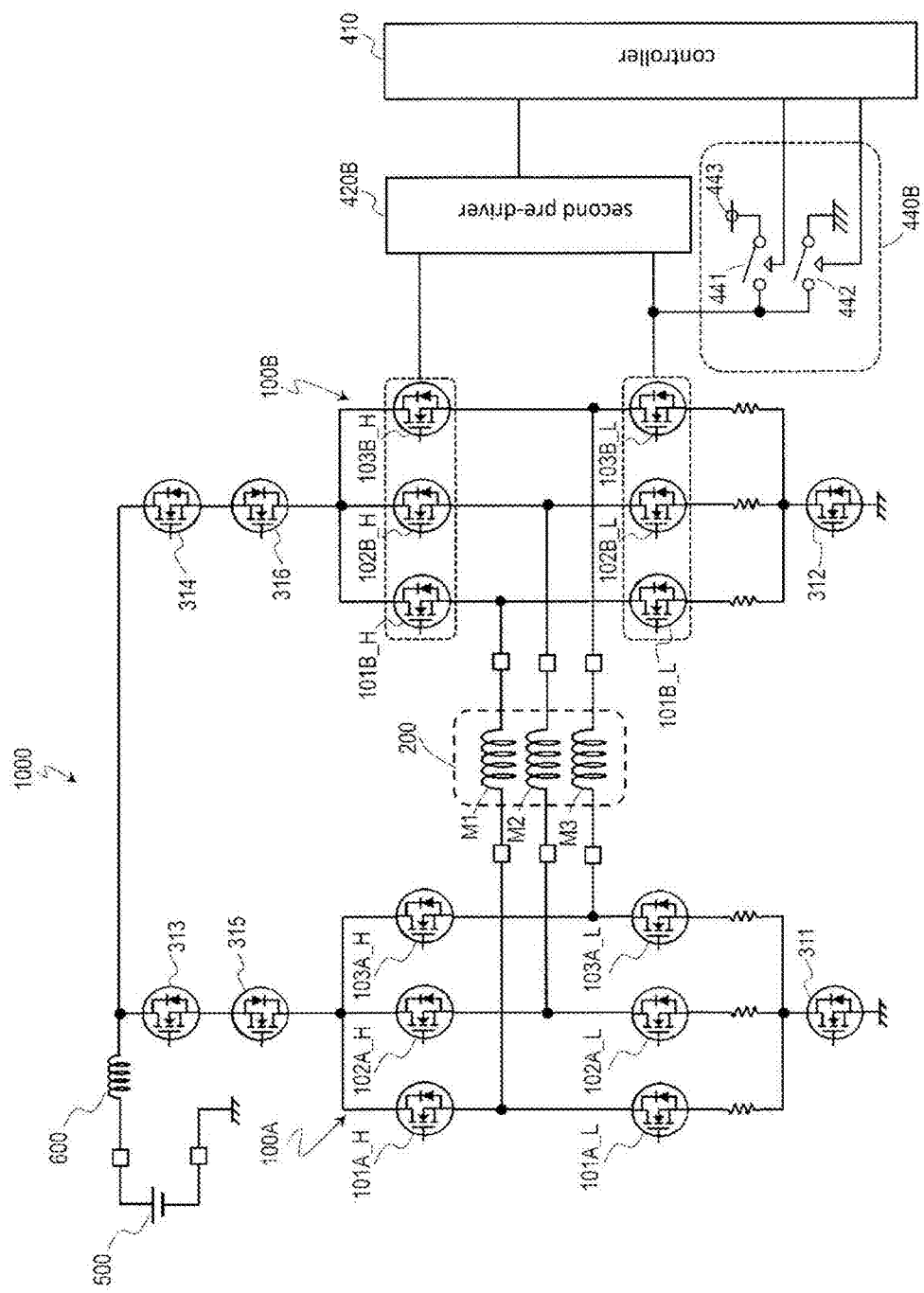
FIG. 2B is a block diagram illustrating functional blocks of a second drive circuit 440B according to an example embodiment of the present disclosure.

FIG. 2A schematically illustrates functional blocks of the first drive circuit 440A, and FIG. 2B schematically illustrates functional blocks of the second drive circuit 440B.

The second power supply voltage is supplied to the first drive circuit 440A as a power supply voltage 443. The second power supply voltage is, for example, the stepped-up voltage CP_Pr2. The first power supply voltage is supplied to the second drive circuit 440B as the power supply voltage 443. The first power supply voltage is, for example, the stepped-up voltage CP_Pr1. Notice that the power supply voltage 443 is set so as to prevent the gate-source voltage of each of the low-side switch elements from exceeding a withstand voltage.

Each of the first drive circuit 440A and the second drive circuit 440B includes switches 441 and 442. In the normal-time control, each of the switches 441 and 442 is in the OFF state.

When a failure has occurred on the first inverter 100A side of the motor 200, the controller 410 turns on the switch 441 in the first drive circuit 440A. Thus, the power supply voltage 443 is applied to each of the three low-side switch elements in the first inverter 100A as the gate voltage. All of the three low-side switch elements enter the ON state, enabling the node NA_L on the low side of the first inverter 100A to function as the neutral point.

When a failure has occurred in the power conversion apparatus 1000, for example, an operation of the power conversion apparatus 1000 may be forcibly stopped. In this case, the controller 410 turns on the switch 442. As a result, the GND potential is applied to each of the three low-side switch elements as the gate voltage, causing each of the three low-side switch elements to enter the OFF state. Note that the switch 442 is optional, and may not be provided in the drive circuit in the case where, for example, the forcible stop is not necessary.

Figure 3:
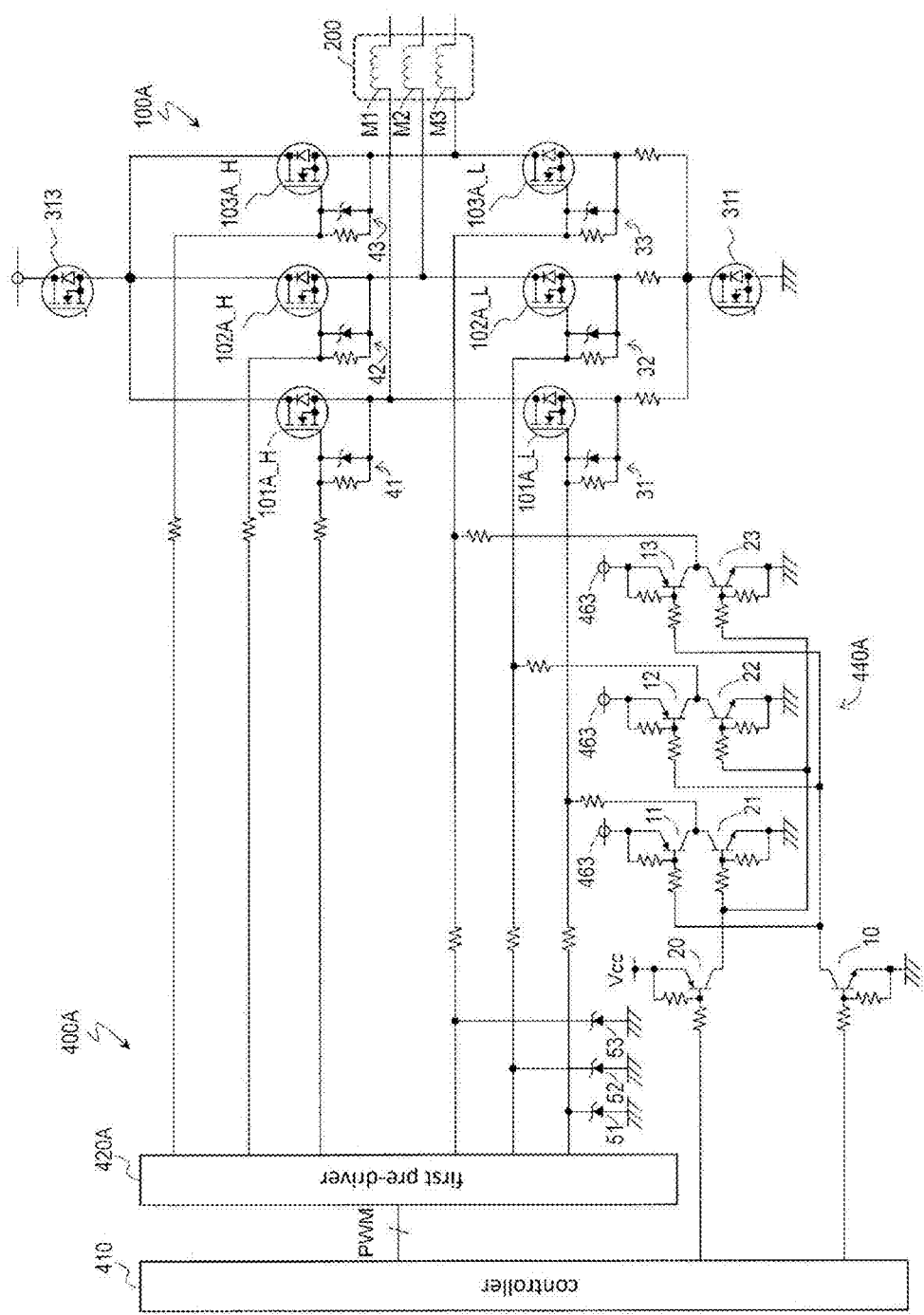
FIG. 3 is a circuit diagram illustrating the circuit configuration of the first drive circuit 440A in a first peripheral circuit 400A.

FIG. 3 schematically illustrates the block structure of the first drive circuit 440A in the first peripheral circuit 400A. Note that, in FIG. 3, the switch element 315 is not shown.

The first drive circuit 440A includes a plurality of switch elements 10, 11, 12, 13, 20, 21, 22, and 23 of an open-collector output type. In the illustrated example, each of the switch elements 11, 12, 13, and 20 is a PNP bipolar transistor. Each of the switch elements 10, 21, 22, and 23 is an NPN bipolar transistor. A push-pull circuit is connected to a gate control signal line for controlling the low-side switch element for each phase via a resistor. The switches 441 and 442 may be formed by a combination of the plurality of transistors 10, 11, 12, 13, 20, 21, 22, and 23 and a plurality of resistors.

If the controller 410 pulls the transistor 20, the transistors 21, 22, and 23 are pushed. As a result, the gate potential of each of the SWs 101A_L, 102A_L, and 103A_L in the first inverter 100A becomes at a low level corresponding to that of the GND potential. In contrast, if the controller 410 pushes the transistor 10, the transistors 11, 12, and 13 are pulled, causing the gate potential of each of the SWs 101A_L, 102A_L, and 103A_L to become at a high level corresponding to that of a power supply voltage 463.

Protection circuits 31, 32, and 33, each of which includes a resistor and a diode connected in parallel, are connected between the sources and the gates of the SWs 101A_L, 102A_L, and 103A_L, respectively. Protection circuits 41, 42, and 43, each of which includes a resistor and a diode connected in parallel, are connected between the sources and the gates of the SWs 101A_H, 102A_H, and 103A_H, respectively.

The power conversion apparatus 1000 may include first and second protection circuits. The first protection circuit includes protection circuits 51, 52, and 53. The protection circuit 51 is preferably connected between the GND and an output terminal (not shown) of the first pre-driver 420A, the output terminal being connected to the gate of the SW 101A_L. Similarly, the protection circuit 52 is preferably connected between the GND and an output terminal (not shown) of the first pre-driver 420A, the output terminal being connected to the gate of the SW 102A_L, and the protection circuit 53 is preferably connected between the GND and an output terminal (not shown) of the first pre-driver 420A, the output terminal being connected to the gate of the SW 103A_L. The second protection circuit, which includes three protection circuits, is preferably provided on the second inverter 100B side of the motor 200 in a similar manner.

When the control signals for turning on the three low-side switch elements are outputted from the first drive circuit 440A to the first inverter 100A, each of the protection circuits 51, 52, and 53 serves to prevent a signal having a voltage level equal to or higher than a specified value (i.e., a withstand voltage) from entering the first pre-driver 420A. This withstand voltage is, for example, a withstand voltage of a circuit element in the first pre-driver 420A for outputting the gate control signal for each of the SWs 101A_L, 102A_L, and 103A_L in the normal-time control.

Each of the protection circuits 51, 52, and 53 is, for example, a Zener diode. Each of the protection circuits 51, 52, and 53 functions when the voltage of the gate control signal outputted by the first drive circuit 440A has become close to the withstand voltage or reached or exceeded the withstand voltage. For example, in the case where the withstand voltage is 18 V, each of the protection circuits 51, 52, and 53 functions when the voltage of the gate control signal has reached or exceeded 17 V. Thus, the voltage supplied to each of the output terminals of the first pre-driver 420A can be limited to values lower than that of the withstand voltage. In the present example embodiment, a higher gate voltage is supplied to each of the SWs 101A_L, 102A_L, and 103A_L than in the normal-time control. Even if this relatively high gate voltage happens to reach or exceed the withstand voltage, the first pre-driver 420A can be protected by the protection circuits 51, 52, and 53.

The first drive circuit 440A enables a higher gate voltage to be supplied to each of the SWs 101A_L, 102A_L, and 103A_L than in the normal-time control. The higher gate voltage contributes to reducing a reduction in the gate-source voltage even when the source potential has become equal to the potential of the neutral point. An increase in the value of ON resistance between the source and the drain of each of the SWs 101A_L, 102A_L, and 103A_L can be reduced, and an unintentional shift of each of the SWs 101A_L, 102A_L, and 103A_L to the OFF state can be prevented.

The power conversion apparatus 1000 includes a ROM (not shown). The ROM is, for example, a writable memory (e.g., a PROM), a rewritable memory (e.g., a flash memory), or a read-only memory. The ROM has stored therein a control program including a collection of commands for causing the controller 410 to control the power conversion apparatus 1000. The control program is, for example, once loaded into a RAM (not shown) at a boot time.

Features worth noting about power supply wires and signal wires on a circuit board (e.g., a printed circuit board) on which parts of the power conversion apparatus 1000 are mounted will now be described below.

The second power supply voltage generated on the second inverter 100B side of the motor 200 is supplied to the first drive circuit 440A. The first power supply voltage generated on the first inverter 100A side of the motor 200 is supplied to the second drive circuit 440B. Accordingly, a first power supply wire and a second power supply wire are arranged on the circuit board. The first power supply wire is, for example, a power supply wire for supplying the first power supply voltage from the first pre-driver 420A or the power supply circuit 430 to the second drive circuit 440B. The second power supply wire is, for example, a power supply wire for supplying the second power supply voltage from the second pre-driver 420B or the power supply circuit 430 to the first drive circuit 440A.

The controller 410 may be connected to the power supply circuit 430 such that the controller 410 and the power supply circuit 430 are capable of communicating with each other. This communication may be, for example, implemented using serial communication, such as I²C communication. Thus, the power supply circuit 430 is capable of detecting an abnormal operation of the controller 410. When an abnormal operation thereof is detected, the power supply circuit 430 is capable of providing a reset signal to the controller 410 to restart the controller 410. Further, the controller 410 is capable of monitoring each of the first pre-driver 420A and the second pre-driver 420B for a failure. This monitoring may be implemented, for example, by each of the pre-drivers transmitting a status of the pre-driver, specifically a status signal indicating a failure, to the controller 410 regularly or at a time when the failure has occurred.

For example, the controller 410 may be arranged to issue an instruction to start operating to the second drive circuit 440B when a failure on the second inverter 100B side of the motor 200 has been detected. In response to the instruction to start operating, the second drive circuit 440B is able to provide the control signals for turning on the three low-side switch elements in the second inverter 100B to the respective low-side switch elements.

For example, the controller 410 may be arranged to issue an instruction to start operating to the first drive circuit 440A when a failure on the first inverter 100A side of the motor 200 has been detected. In response to the instruction to start operating, the first drive circuit 440A is able to provide the control signals for turning on the three low-side switch elements in the first inverter 100A to the respective low-side switch elements.

Arranging each of the drive circuits to start operating in response to the instruction from the controller 410 as described above makes it possible to cause the drive circuit to properly start operating only when a failure has occurred. As a result, a lower power consumption can be achieved than in the case where the drive circuit is arranged to operate at all times.

Modifications of the present example embodiment will be described below with reference to FIGS. 4, 5A, and 5B.

Figure 4:
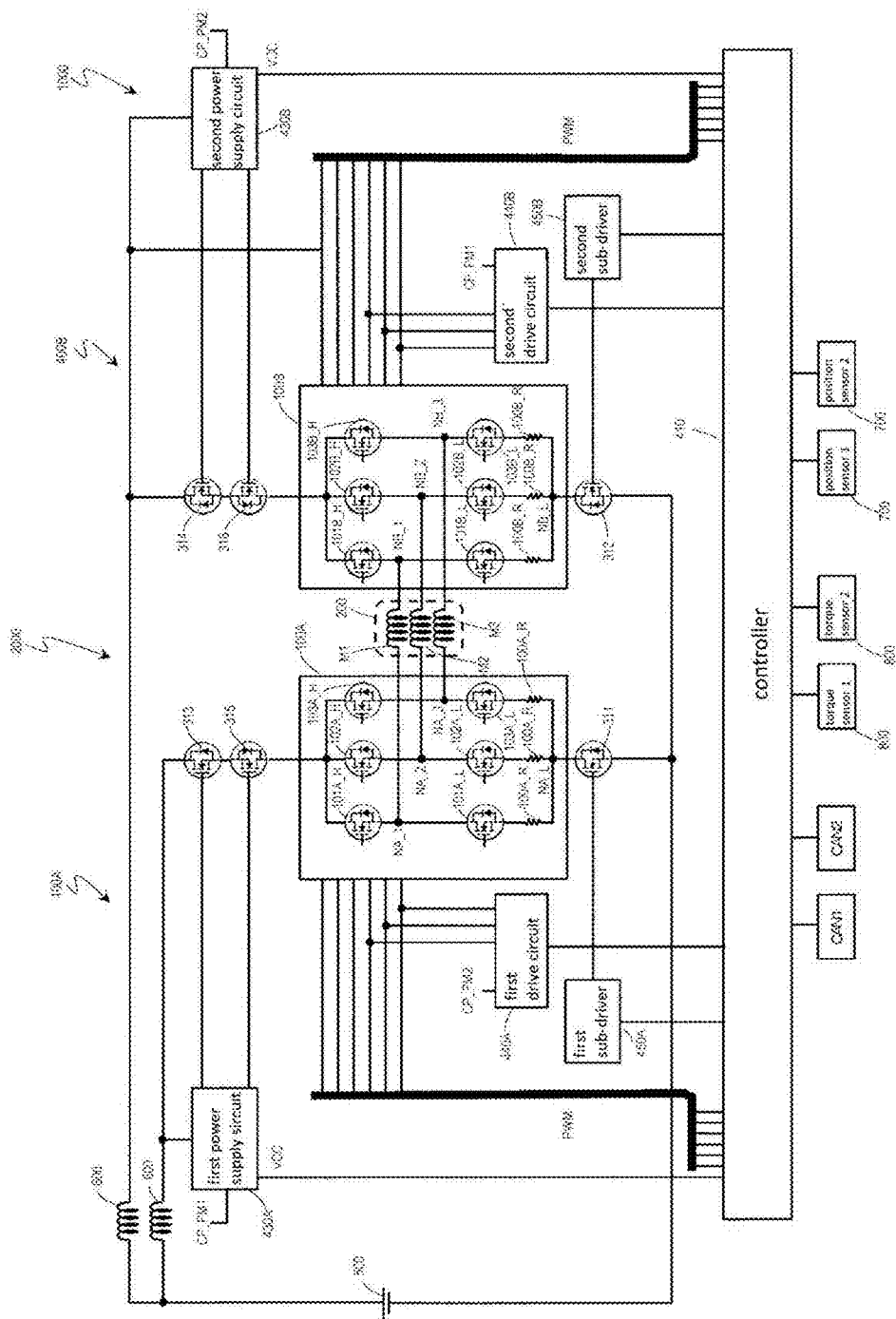
FIG. 4 is a schematic diagram illustrating an example block structure of a power conversion apparatus 1000 according to a modification of the first example embodiment of the present disclosure.

FIG. 4 schematically illustrates an example block structure of a power conversion apparatus 1000 according to a modification of the present example embodiment.

The power conversion apparatus 1000 according to this modification is different from the power conversion apparatus 1000 illustrated in FIG. 1 in that the first pre-driver 420A and the second pre-driver 420B are not provided. In this case, the controller 410 may contain a pre-driver.

For motor drive, a large voltage and a large electric current are generally required to drive switch elements (i.e., power elements) of an inverter. Pre-drivers are used as circuits for converting PWM control signals from a controller to signals of a high voltage and a large electric current. In other words, a pre-driver is not necessarily required for a motor capable of operating on a low voltage. Accordingly, the function of the pre-driver may be implemented in the controller. In the power conversion apparatus 1000 according to an example embodiment of the present disclosure, which supplies power to a motor 200 capable of operating on a low voltage, the controller 410 may contain a pre-driver. In this case, the controller 410 is capable of directly controlling the first inverter 100A and the second inverter 100B.

As illustrated in FIG. 4, as power supply circuits, a first power supply circuit 430A and a second power supply circuit 430B may be provided in the first peripheral circuit 400A and the second peripheral circuit 400B, respectively. The first power supply circuit 430A and the second power supply circuit 430B are separate power supply circuits. The first power supply circuit 430A is capable of generating a voltage CP_PM1 by stepping up the voltage of the power supply 500, and the second power supply circuit 430B is capable of generating a voltage CP_PM2 by stepping up the voltage of the power supply 500.

The stepped-up voltage CP_PM1 may be supplied from the first power supply circuit 430A to the second drive circuit 440B as the first power supply voltage, while the stepped-up voltage CP_PM2 may be supplied from the second power supply circuit 430B to the first drive circuit 440A as the second power supply voltage. The power supply voltage VCC may be supplied from the first power supply circuit 430A or the second power supply circuit 430B to the controller 410.

When the two power supply circuits are provided as described above, even if a failure of the first power supply circuit 430A occurs, for example, the second power supply circuit 430B is able to continue the supply of the power supply voltage VCC to the controller 410. This allows the controller 410 to continue to control the switching operations of the switch elements in the second inverter 100B. Further, the node NA_L on the low side of the first inverter 100A can be caused to function as the neutral point by supplying the stepped-up voltage CP_PM2 from the second power supply circuit 430B to the first drive circuit 440A. Control using the neutral point will be described in detail below.

Figure 5A:
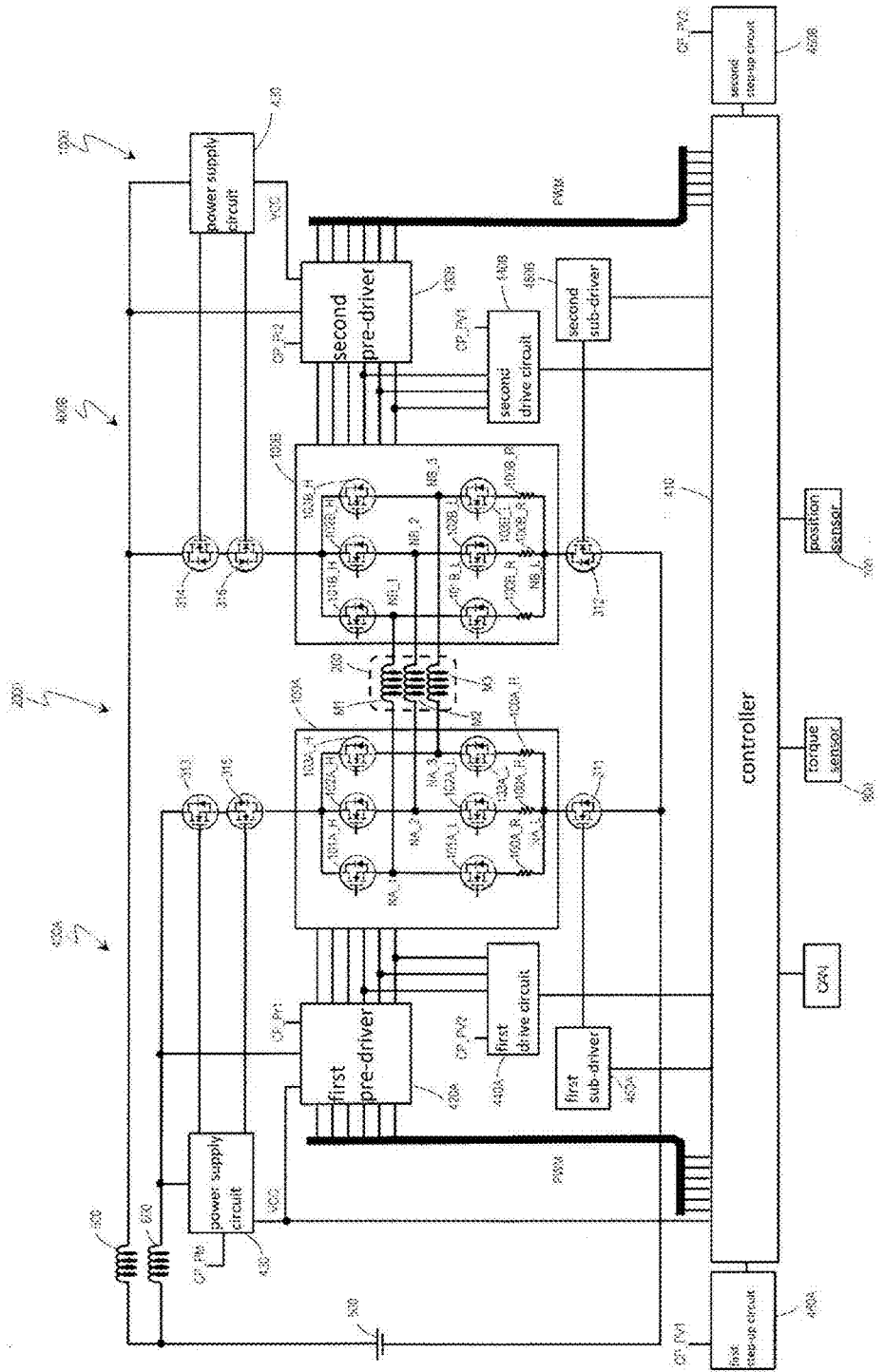
FIG. 5A is a schematic diagram illustrating an example block structure of a power conversion apparatus 1000 according to another modification of the first example embodiment of the present disclosure.
Figure 5B:
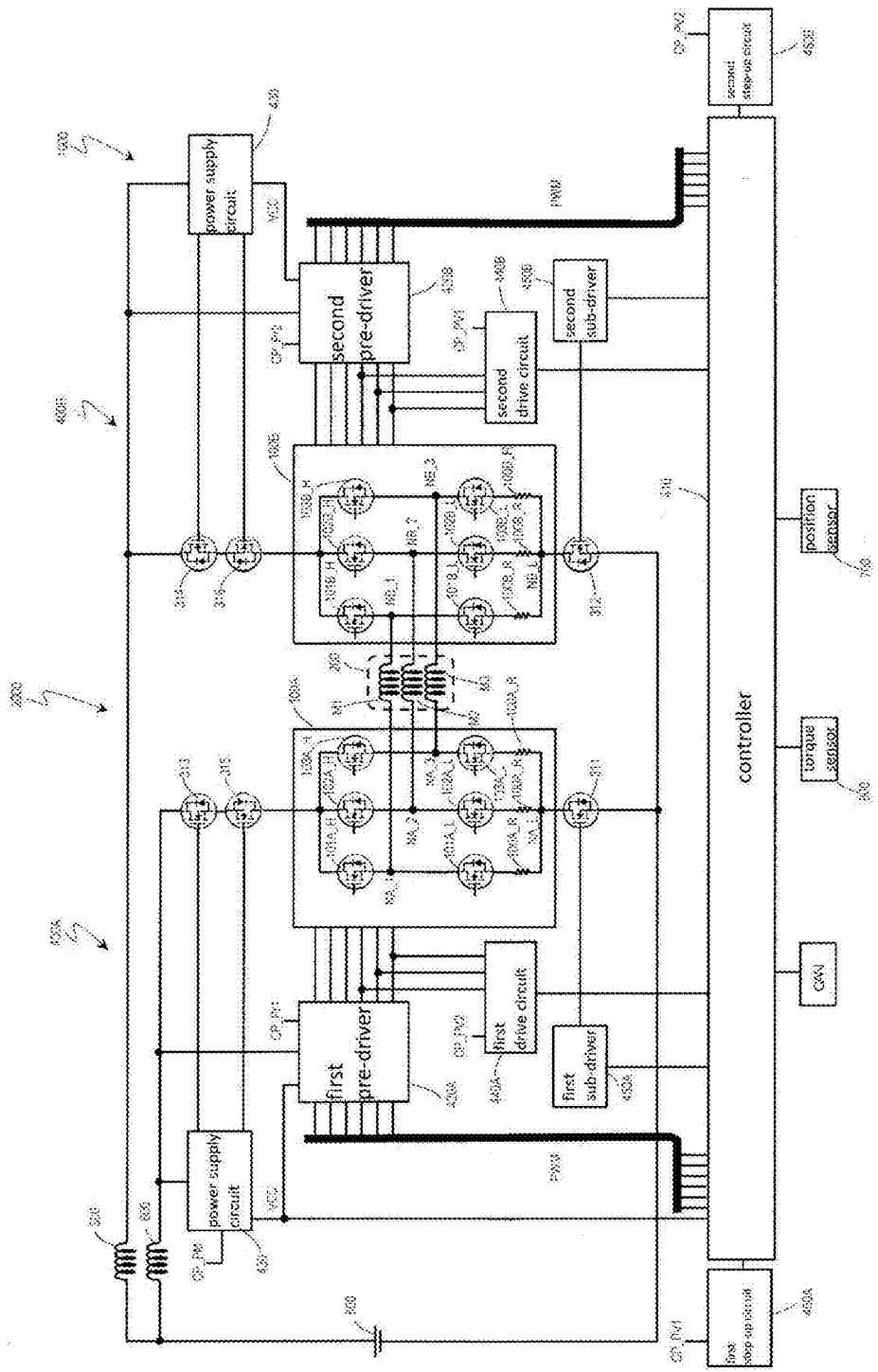
FIG. 5B is a schematic diagram illustrating an example block structure of a power conversion apparatus 1000 according to yet another modification of the first example embodiment of the present disclosure.

FIGS. 5A and 5B schematically illustrate example block structures of power conversion apparatuses 1000 according to other modifications of the present example embodiment. The power conversion apparatuses 1000 according to these modifications are different from the power conversion apparatus 1000 illustrated in FIG. 1 in that a single step-up circuit 460 or a first step-up circuit 460A and a second step-up circuit 460B are additionally provided.

In the above description of the present example embodiment, an example case where the first power supply voltage is generated by at least one of the first pre-driver 420A and the power supply circuit 430, and the second power supply voltage is generated by at least one of the second pre-driver 420B and the power supply circuit 430, has been described. Each of the power conversion apparatuses 1000 according to the present modifications is provided with a step-up circuit(s) for generating the first power supply voltage and the second power supply voltage, separately from the power supply circuit and the pre-drivers.

As illustrated in FIG. 5A, the single step-up circuit 460 may be connected to the controller 410. The step-up circuit 460 generates a voltage CP_PV by stepping up the voltage of the power supply 500. The stepped-up voltage CP_PV is, for example, 18 V. In this modification, the stepped-up voltage CP_PV may be supplied from the step-up circuit 460 to the second drive circuit 440B as the first power supply voltage, and the stepped-up voltage CP_PV may be supplied from the step-up circuit 460 to the first drive circuit 440A as the second power supply voltage.

As illustrated in FIG. 5B, the two step-up circuits may be connected to the controller 410. The first step-up circuit 460A is provided in the first peripheral circuit 400A, and generates a voltage CP_PV1 by stepping up the voltage of the power supply 500. The second step-up circuit 460B is provided in the second peripheral circuit 400B, and generates a voltage CP_PV2 by stepping up the voltage of the power supply 500. Each of the stepped-up voltages CP_PV1 and CP_PV2 is, for example, 18 V. In this modification, the stepped-up voltage CP_PV1 may be supplied to the second drive circuit 440B as the first power supply voltage, and the stepped-up voltage CP_PV2 may be supplied to the first drive circuit 440A as the second power supply voltage.

First, a specific example of a control method for the power conversion apparatus 1000 during normal operation will be described below. During normal operation, none of the power conversion apparatus 1000 and the windings M1, M2, and M3 for the three phases of the motor 200 are malfunctioning.

The controller 410 outputs a control signal for turning on the SW 311 to the first sub-driver 450A, and outputs a control signal for turning on the SW 312 to the second sub-driver 450B. The power supply circuit 430 (see FIG. 1) outputs control signals for turning on the SWs 313, 314, 315, and 316.

As a result, all of the SWs 311, 312, 313, 314, 315, and 316 are in the ON state. The power supply 500 and the first inverter 100A are electrically connected to each other, and the power supply 500 and the second inverter 100B are electrically connected to each other. In addition, the first inverter 100A and the GND are electrically connected to each other, and the second inverter 100B and the GND are electrically connected to each other. In this state of connection, the controller 410 outputs PWM signals for controlling the switching operations of the switch elements in the first inverter 100A and the second inverter 100B to the first pre-driver 420A and the second pre-driver 420B. The states of the switch elements in the first inverter 100A and the second inverter 100B are switched to energize the windings M1, M2, and M3 for the three phases as appropriate to drive the motor 200. In the present specification, energizing the windings for the three phases will sometimes be referred to as "three-phase energization control."

Figure 6:
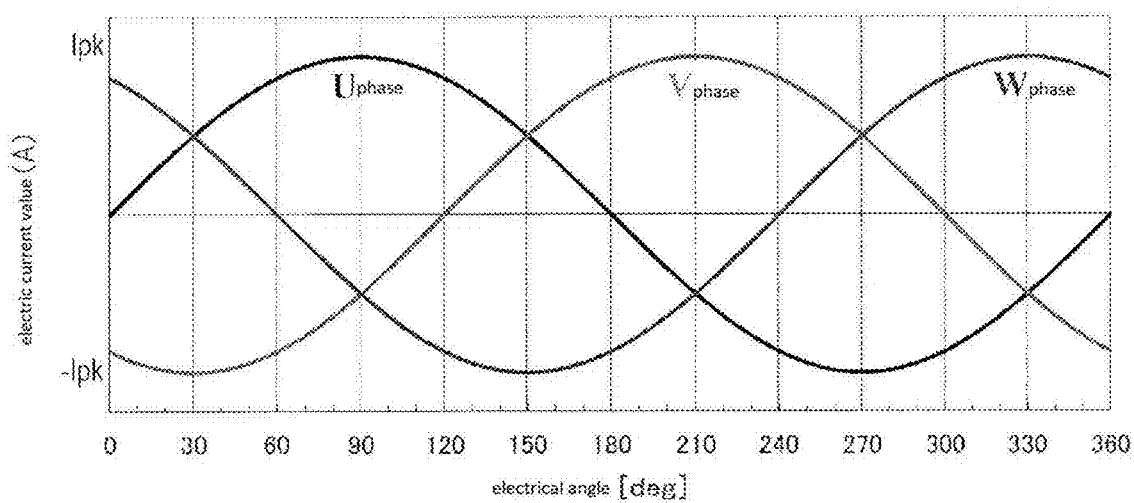
FIG. 6 is a graph illustrating electric current waveforms (sine waves) obtained by plotting values of electric currents passing through windings for a U phase, a V phase, and a W phase of a motor 200 when the power conversion apparatus 1000 is controlled in accordance with three-phase energization control.

FIG. 6 illustrates electric current waveforms (sine waves) obtained by plotting values of electric currents passing through the windings for the U phase, the V phase, and the W phase of the motor 200 when the power conversion apparatus 1000 is controlled in accordance with the three-phase energization control. The horizontal axis represents the electrical angle (deg) of the motor, while the vertical axis represents the electric current value (A). In the electric current waveforms of FIG. 6, electric current values are plotted at intervals of an electrical angle of 30°. $I_{pk}$ represents a maximum electric current value (i.e., a peak current value) of each phase.

Table 1 shows the values of electric currents passing through each inverter at various electrical angles in the sine waves of FIG. 6. Specifically, Table 1 shows the values of electric currents passing through the nodes NA_1, NA_2, and NA_3 in the first inverter 100A (see FIG. 1) at intervals of an electrical angle of 30°, and the values of electric currents passing through nodes NB_1, NB_2, and NB_3 in the second inverter 100B (see FIG. 1) at intervals of an electrical angle of 30°. Here, with respect to the first inverter 100A, a direction in which an electric current passes from the first inverter 100A to the second inverter 100B is defined as a positive direction. The direction of the electric currents shown in FIG. 6 follows this definition. Meanwhile, with respect to the second inverter 100B, a direction in which an electric current passes from the second inverter 100B to the first inverter 100A is defined as a positive direction. Accordingly, there is a phase difference of 180° between the electric current in the first inverter 100A and the electric current in the second inverter 100B. In Table 1, the magnitude of an electric current value $I_1$ is $(3^{1/2}/2)*I_{pk}$, and the magnitude of an electric current value $I_2$ is $I_{pk}/2$.

TABLE 1

| | | Electrical angle [deg] | | | | | | | | | | | |
| --- | --- | --- | --- | --- | --- | --- | --- | --- | --- | --- | --- | --- | --- |
| | | 0 (360) | 30 | 60 | 90 | 120 | 150 | 180 | 210 | 240 | 270 | 300 | 330 |
| First inverter | U phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Second inverter | U phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W phase | $-I_1$ | $-I_2$ | 0 | $I_2$ | $I_1$ | $I_{pk}$ | $I_1$ | $I_2$ | 0 | $-I_2$ | $-I_1$ | $I_{pk}$ |

In the electric current waveforms illustrated in FIG. 6, a sum of the electric currents passing in the windings for the three phases with the direction of the electric currents taken into account is zero at each electrical angle. However, the circuit configuration of the power conversion apparatus 1000 allows the electric currents passing through the windings for the three phases to be independently controlled, allowing control to be performed such that the sum of the electric currents is not zero. For example, the controller 410 outputs PWM signals for obtaining the electric current waveforms illustrated in FIG. 6 to the first pre-driver 420A and the second pre-driver 420B.

Next, a specific example of a control method for the power conversion apparatus 1000 during abnormal operation will be described below with reference to an example case where a failure has occurred in the first peripheral circuit 400A. The control method to be described below is applied also in a case where a failure has occurred in the second peripheral circuit 400B.

Suppose, for example, that a failure of the first pre-driver 420A has occurred in the first peripheral circuit 400A. In this case, because of the failure of the first pre-driver 420A, three-phase energization control according to the normal-time control is not possible although a failure of the first inverter 100A has not occurred.

If a failure of the first pre-driver 420A is detected, the controller 410 switches control of the motor 200 from the normal-time control to the abnormal-time control. The controller 410 issues the instruction to start operating to the first drive circuit 440A. Since the second power supply voltage is supplied from the second pre-driver 420B to the first drive circuit 440A, for example, the failure of the first pre-driver 420A does not affect the first drive circuit 440A.

In response to the instruction to start operating from the controller 410, the first drive circuit 440A provides the control signals for turning on the SWs 101A_L, 102A_L, and 103A_L in the first inverter 100A to the SWs 101A_L, 102A_L, and 103A_L, respectively. The controller 410 outputs a control signal for turning off the SW 311 to the first sub-driver 450A. As a result, the SW 311 enters the OFF state, causing the first inverter 100A to be electrically separated from the GND. Each of the SWs 101A_L, 102A_L, and 103A_L comes to be in the ON state at all times, enabling the node NA_L on the low side of the first inverter 100A to function as the neutral point. At this time, each of the SWs 101A_H, 102A_H, and 103A_H in the first inverter 100A is in the OFF state. Each of the switch elements 313 and 315 may be either in the ON state or in the OFF state, but is preferably in the OFF state.

Figure 7:
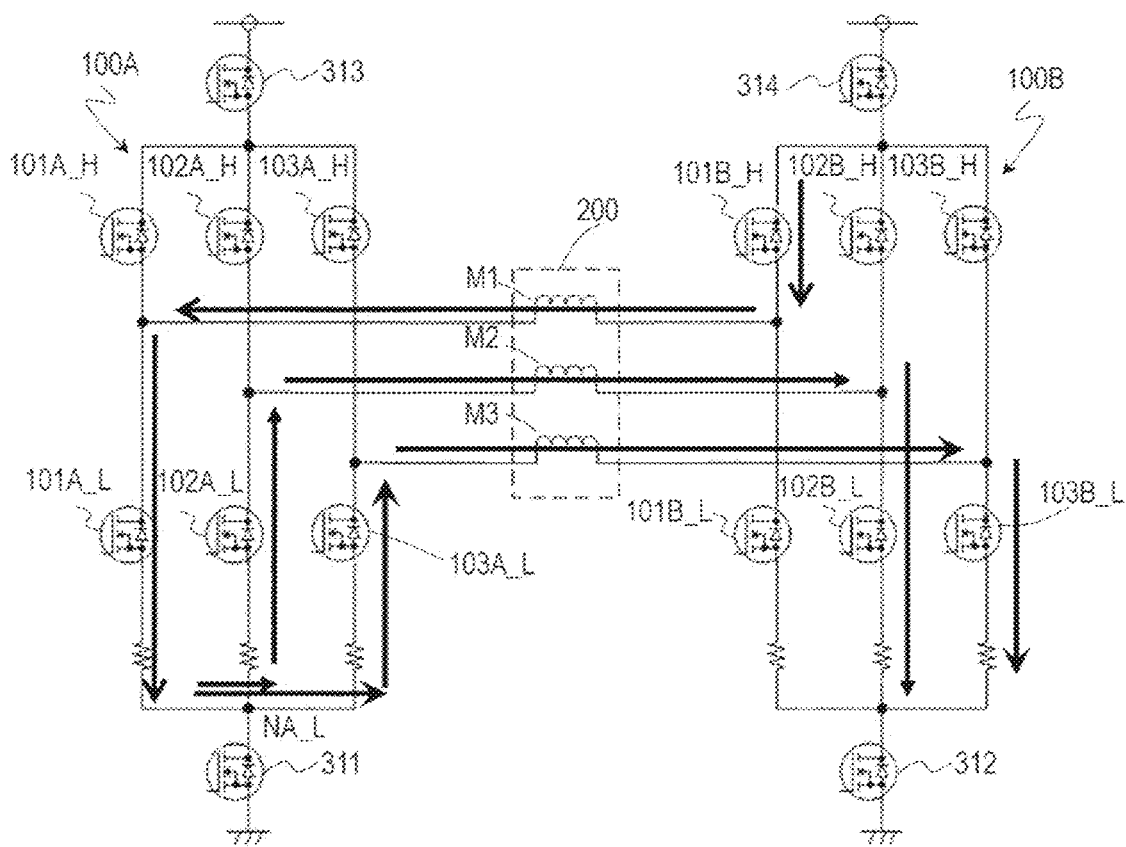
FIG. 7 is a schematic diagram illustrating electric currents passing through two inverters at an electrical angle of 270° in the electric current waveforms illustrated in FIG. 6.

FIG. 7 illustrates electric currents passing through the two inverters at an electrical angle of 270° in the electric current waveforms illustrated in FIG. 6.

The controller 410 is able to continue the three-phase energization control using the neutral point in the first inverter 100A, by outputting PWM signals to the second pre-driver 420B. For example, the controller 410 is able to energize the windings M1, M2, and M3 by outputting the PWM signals for obtaining the electric current waveforms illustrated in FIG. 6 to the switch elements in the second inverter 100B.

According to the present example embodiment, even if a failure of the first pre-driver 420A occurs, the three-phase energization control can be continued using the neutral point since the second power supply voltage is supplied to the first drive circuit 440A.

In another example modification, the power supply circuit 430 in the configuration illustrated in FIG. 1 may be replaced with the first power supply circuit 430A and the second power supply circuit 430B, i.e., two power supply circuits, illustrated in FIG. 4. In this case, if a failure of the first power supply circuit 430A occurs, supply of the power supply voltage VCC to the first pre-driver 420A becomes impossible, making it impossible to drive the first inverter 100A.

According to the present example embodiment, the stepped-up voltage CP_PM2 generated by the second power supply circuit 430B or the stepped-up voltage CP_Pr2 generated by the second pre-driver 420B, for example, can be supplied to the first drive circuit 440A. Accordingly, the first drive circuit 440A is able to provide the control signals for turning on the SWs 101A_L, 102A_L, and 103A_L in the first inverter 100A to the SWs 101A_L, 102A_L, and 103A_L, respectively, without being affected by the failure of the first power supply circuit 430A.

Figure 8:
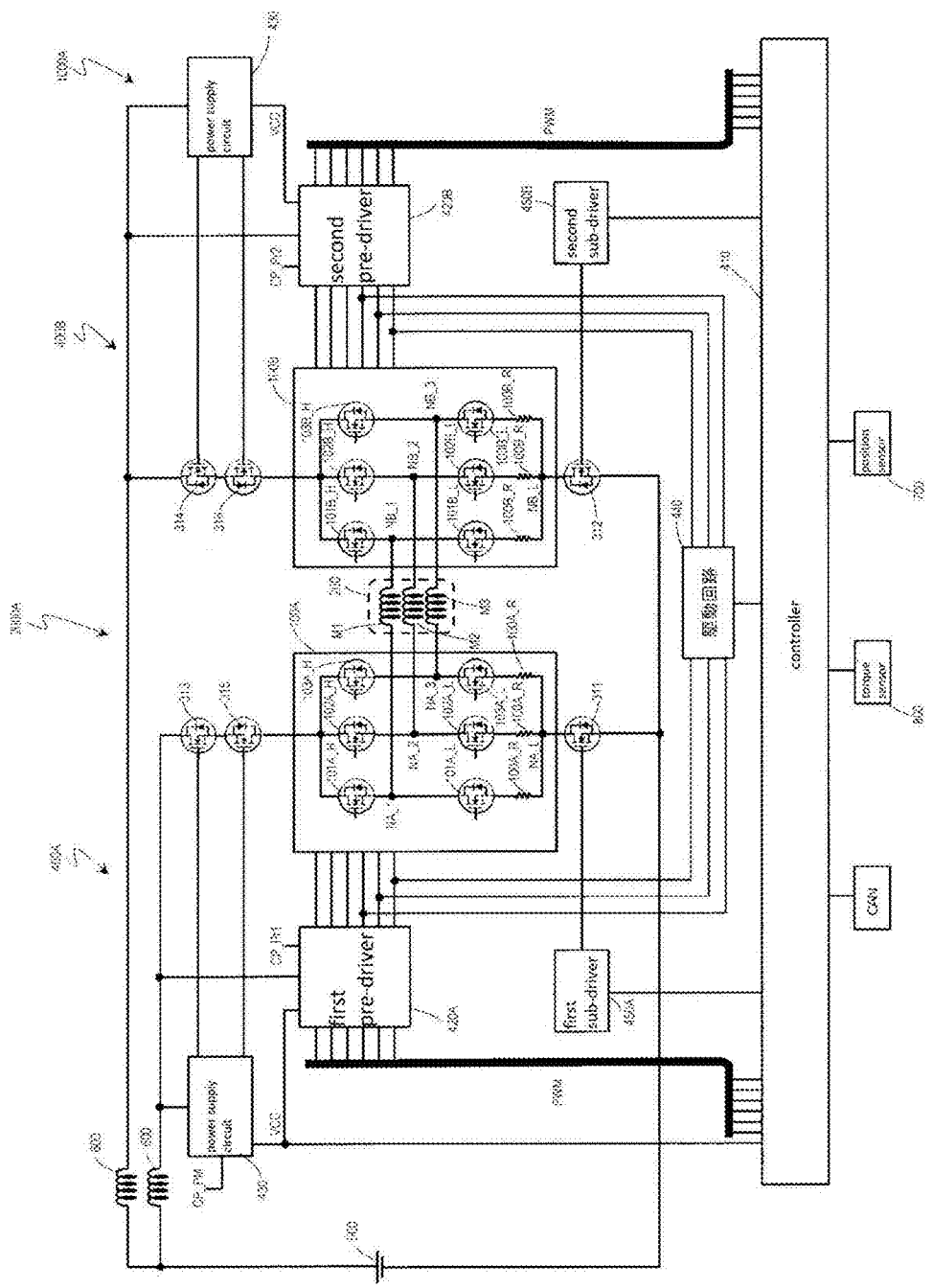
FIG. 8 is a schematic diagram illustrating the block structure of a motor module 2000A according to a second example embodiment of the present disclosure, and illustrating, primarily, the block structure of a power conversion apparatus 1000A.
Figure 9:
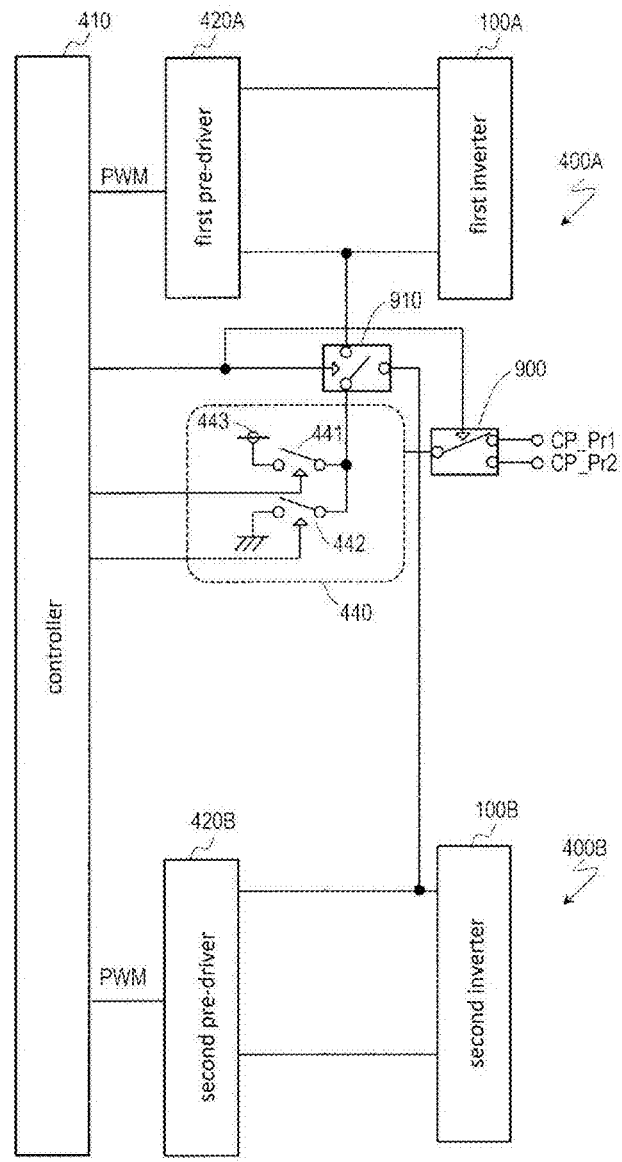
FIG. 9 is a block diagram illustrating functional blocks of a drive circuit 440 according to an example embodiment of the present disclosure and those in its periphery.

FIG. 8 schematically illustrates the block structure of a motor module 2000A according to a second example embodiment of the present disclosure, and schematically illustrates, primarily, the block structure of a power conversion apparatus 1000A. FIG. 9 schematically illustrates functional blocks of a drive circuit 440 and those in its periphery.

The power conversion apparatus 1000A is different from the power conversion apparatus 1000 according to the first example embodiment in that the power conversion apparatus 1000A includes the drive circuit 440, which is commonly used for a first inverter 100A and a second inverter 100B. Differences from the first example embodiment will be primarily described below.

The power conversion apparatus 1000A includes the drive circuit 440, which is commonly used for the first inverter 100A and the second inverter 100B, a first switch 900, and a second switch 910.

The drive circuit 440 is connected to three low-side switch elements in the first inverter 100A and three low-side switch elements in the second inverter 100B. When a failure has occurred on the first inverter 100A side of a motor 200, the drive circuit 440 provides control signals for turning on the three low-side switch elements in the first inverter 100A to those low-side switch elements with supply of a second power supply voltage, while when a failure has occurred on the second inverter 100B side, the drive circuit 440 provides control signals for turning on the three low-side switch elements in the second inverter 100B to those low-side switch elements with supply of a first power supply voltage.

As with each of the first drive circuit 440A and the second drive circuit 440B according to the first example embodiment, the drive circuit 440 includes switches 441 and 442, and may be formed by a plurality of transistors of the open-collector output type and a plurality of resistors. The drive circuit 440 is controlled by a controller 410.

Suppose, for example, that a failure has occurred on the first inverter 100A side, i.e., in a first peripheral circuit 400A. If the controller 410 receives a status signal indicating the failure from a first pre-driver 420A, for example, the controller 410 starts controlling the drive circuit 440.

Under control of the controller 410, the first switch 900 makes a switch between supplying the first power supply voltage to the drive circuit 440 as a power supply voltage 443 and supplying the second power supply voltage to the drive circuit 440 as the power supply voltage 443. If a failure of the first pre-driver 420A is detected, the controller 410 determines to control the first switch 900 to supply the second power supply voltage (e.g., CP_Pr2) to the drive circuit 440 as the power supply voltage 443.

In response to control of the controller 410, the second switch 910 makes a switch between supplying outputs of the drive circuit 440 from the drive circuit 440 to the three low-side switch elements in the first inverter 100A and supplying the outputs from the drive circuit 440 to the three low-side switch elements in the second inverter 100B. If the failure of the first pre-driver 420A is detected, the controller 410 determines to control the second switch 910 to supply the outputs of the drive circuit 440 to the three low-side switch elements in the first inverter 100A.

As with the first example embodiment, the present example embodiment enables the three-phase energization control to be continued using a neutral point in one of the inverters even if a failure occurs in the first peripheral circuit 400A or a second peripheral circuit 400B. Moreover, the present example embodiment offers advantages in circuit area and cost since the drive circuit 440 is commonly used for the first inverter 100A and the second inverter 100B.

The drive circuit 440 may be, for example, an integrated circuit having the first drive circuit 440A and the second drive circuit 440B according to the first example embodiment integrated into one chip. The circuit in such a form also falls within the scope of the present disclosure.

Figure 10:
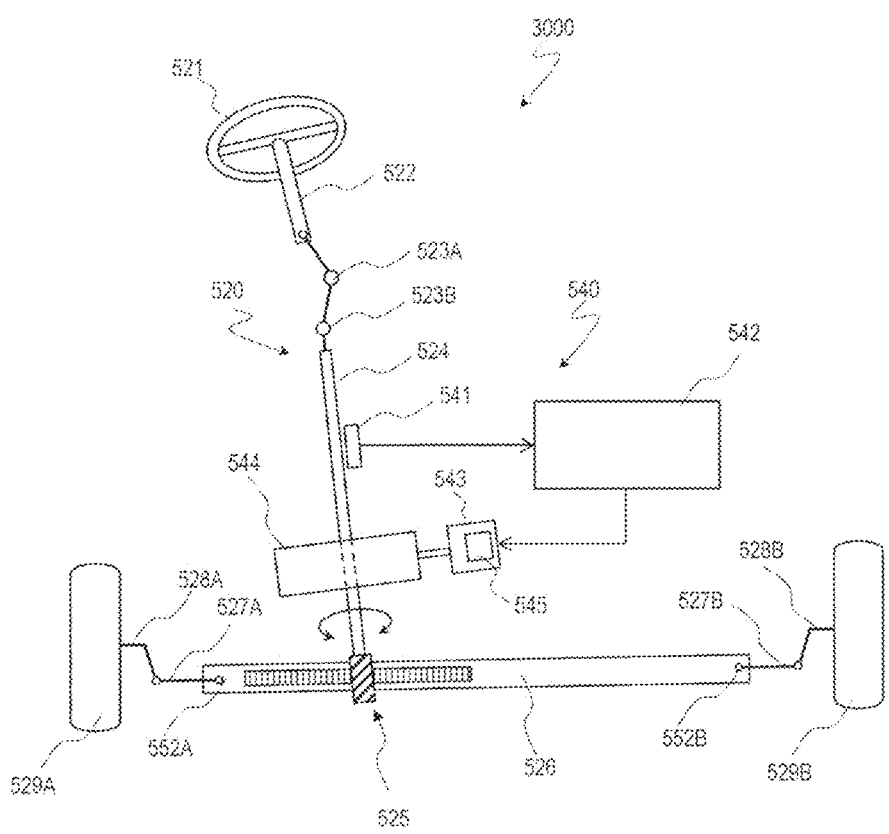
FIG. 10 is a schematic diagram illustrating a typical structure of an electric power steering apparatus 3000 according to a third example embodiment of the present disclosure.

FIG. 10 schematically illustrates a typical structure of an electric power steering apparatus 3000 according to a third example embodiment of the present disclosure.

A vehicle such as an automobile generally includes an electric power steering (EPS) apparatus. The electric power steering apparatus 3000 according to the present example embodiment includes a steering system 520, and an assistive torque mechanism 540 that generates an assistive torque. The electric power steering apparatus 3000 generates an assistive torque that assists a steering wheel torque of the steering system which is generated by a driver operating a steering wheel. The assistive torque reduces a load of the operation by the driver.

The steering system 520 includes, for example, a steering wheel 521, a steering shaft 522, flexible shaft couplings 523A and 523B, a rotating shaft 524, a rack-and-pinion mechanism 525, a rack shaft 526, left and right ball joints 552A and 552B, tie rods 527A and 527B, knuckles 528A and 528B, and left and right steerable wheels 529A and 529B.

The assistive torque mechanism 540 includes, for example, a steering wheel torque sensor 541, an automobile-use electronic control unit (ECU) 542, a motor 543, and a speed reduction mechanism 544. The steering wheel torque sensor 541 detects a steering wheel torque in the steering system 520. The ECU 542 generates a drive signal on the basis of a detection signal obtained by the steering wheel torque sensor 541. The motor 543 generates an assistive torque that matches the steering wheel torque on the basis of the drive signal. The motor 543 transfers the generated assistive torque to the steering system 520 through the speed reduction mechanism 544.

The ECU 542 includes, for example, the first peripheral circuit 400A and the second peripheral circuit 400B according to the first example embodiment. In an automobile, an electronic control system having an ECU as a core unit is constructed. In the electric power steering apparatus 3000, a motor driving unit is constructed using, for example, the ECU 542, the motor 543, and an inverter 545. In this unit, each of the motor modules 2000 and 2000A according to the first and second example embodiments, respectively, can be suitably used.

Example embodiments of the present disclosure are widely applicable to a variety of devices including various types of motors, such as, for example, a vacuum cleaner, a dryer, a ceiling fan, a washing machine, a refrigerator, and an electric power steering apparatus.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion apparatus that converts power from a power supply to power to be supplied to a motor including windings for n phases, where n is an integer equal to or greater than three, the power conversion apparatus comprising:
    a first inverter connected to ends of the windings of respective phases of the motor and including n legs, each of which includes a low-side switch element and a high-side switch element;
    a second inverter connected to other ends of the windings of the respective phases and including n legs, each of which includes a low-side switch element and a high-side switch element;
    a drive circuit connected to the n low-side switch elements in the first inverter and the n low-side switch elements in the second inverter to:
    provide control signals to turn on the n low-side switch elements in the first inverter to the n low-side switch elements when a failure has occurred on the first inverter side of the motor; and
    provide control signals to turn on the n low-side switch elements in the second inverter to the n low-side switch elements when a failure has occurred on the second inverter side of the motor; and
    a control circuit to control switching operations of the n low-side switch elements and the n high-side switch elements in each of the first inverter and the second inverter, and control the drive circuit; wherein
    when a failure has occurred on the second inverter side of the motor, a first power supply voltage generated on the first inverter side of the motor is supplied to the drive circuit; and
    when a failure has occurred on the first inverter side of the motor, a second power supply voltage generated on the second inverter side of the motor is supplied to the drive circuit.

2. The power conversion apparatus according to claim 1, wherein the drive circuit includes:
    a first drive circuit connected to the n low-side switch elements in the first inverter to, when a failure has occurred on the first inverter side of the motor, provide the control signals to turn on the n low-side switch elements in the first inverter to the n low-side switch elements with supply of the second power supply voltage; and
    a second drive circuit connected to the n low-side switch elements in the second inverter to, when a failure has occurred on the second inverter side of the motor, provide the control signals to turn on the n low-side switch elements in the second inverter to the n low-side switch elements with supply of the first power supply voltage; and
    the control circuit controls each of the first drive circuit and the second drive circuit.

3. The power conversion apparatus according to claim 2, further comprising:
    a first pre-driver to generate control signals to control the switching operations of the n low-side switch elements and the n high-side switch elements in the first inverter under control of the control circuit, and provide the generated control signals to the n low-side switch elements and the n high-side switch elements; and a second pre-driver to generate control signals to control the switching operations of the n low-side switch elements and the n high-side switch elements in the second inverter under control of the control circuit, and provide the generated control signals to the n low-side switch elements and the n high-side switch elements.

4. The power conversion apparatus according to claim 3, wherein
the first power supply voltage is generated by the first pre-driver, and is supplied to the second drive circuit;
the second power supply voltage is generated by the second pre-driver, and is supplied to the first drive circuit; and
the first power supply voltage is higher than a voltage of the power supply, and the second power supply voltage is higher than the voltage of the power supply.

5. The power conversion apparatus according to claim 4, further comprising a power supply circuit to supply a power supply voltage to each of the control circuit, the first pre-driver, and the second pre-driver.

6. The power conversion apparatus according to claim 3, further comprising:
a first power supply wire to supply the first power supply voltage from the first pre-driver to the second drive circuit; and
a second power supply wire to supply the second power supply voltage from the second pre-driver to the first drive circuit.

7. The power conversion apparatus according to claim 3, further comprising a step-up circuit to generate each of the first power supply voltage and the second power supply voltage by stepping up the voltage of the power supply; wherein
each of the first power supply voltage and the second power supply voltage is higher than the voltage of the power supply; and
the first power supply voltage is supplied from the step-up circuit to the second drive circuit, and the second power supply voltage is supplied from the step-up circuit to the first drive circuit.

8. The power conversion apparatus according to claim 3, further comprising a power supply circuit to supply a power supply voltage to each of the control circuit, the first pre-driver, and the second pre-driver; wherein
the second power supply voltage is generated by the power supply circuit, and is supplied to the first drive circuit, while the first power supply voltage is generated by the power supply circuit, and is supplied to the second drive circuit; and
the first power supply voltage is higher than a voltage of the power supply, and the second power supply voltage is higher than the voltage of the power supply.

9. The power conversion apparatus according to claim 1, wherein a magnitude of the first power supply voltage is equal to a magnitude of the second power supply voltage.

10. The power conversion apparatus according to claim 5, wherein the control circuit and the power supply circuit are connected to each other to be capable of communicating with each other.

11. The power conversion apparatus according to claim 10, wherein
when a failure on the second inverter side of the motor has been detected, the control circuit issues an instruction to start operating to the second drive circuit, and in response to the instruction to start operating, the second drive circuit provides the control signals to turn on the n low-side switch elements in the second inverter to the n low-side switch elements; and
when a failure on the first inverter side of the motor has been detected, the control circuit issues an instruction to start operating to the first drive circuit, and in response to the instruction to start operating, the first drive circuit provides the control signals to turn on the n low-side switch elements in the first inverter to the n low-side switch elements.

12. The power conversion apparatus according to claim 1, further comprising:
a first switch element to switch a state of connection between the first inverter and a ground;
a second switch element to switch a state of connection between the second inverter and the ground;
a third switch element to switch a state of connection between the first inverter and the power supply; and
a fourth switch element to switch a state of connection between the second inverter and the power supply.

13. The power conversion apparatus according to claim 3, wherein
a voltage level of each of the control signals provided by the first drive circuit to the n low-side switch elements in the first inverter is higher than a voltage level of each of the control signals provided by the first pre-driver to the n low-side switch elements in the first inverter; and
a voltage level of each of the control signals provided by the second drive circuit to the n low-side switch elements in the second inverter is higher than a voltage level of each of the control signals provided by the second pre-driver to the n low-side switch elements in the second inverter.

14. The power conversion apparatus according to claim 3, wherein
a voltage level of each of the control signals provided by the first drive circuit to the n low-side switch elements in the first inverter is equal to a voltage level of each of the control signals provided by the first pre-driver to the n high-side switch elements in the first inverter; and
a voltage level of each of the control signals provided by the second drive circuit to the n low-side switch elements in the second inverter is equal to a voltage level of each of the control signals provided by the second pre-driver to the n high-side switch elements in the second inverter.

15. The power conversion apparatus according to claim 13, wherein each of the first drive circuit and the second drive circuit includes a plurality of transistors including an open-collector output.

16. The power conversion apparatus according to claim 13, further comprising:
a first protection circuit to prevent a signal having a voltage level equal to or higher than a specified value from entering the first pre-driver when the control signals to turn on the n low-side switch elements are outputted from the first drive circuit to the first inverter; and
a second protection circuit to prevent a signal having a voltage level equal to or higher than a specified value from entering the second pre-driver when the control signals to turn on the n low-side switch elements are outputted from the second drive circuit to the second inverter.

17. The power conversion apparatus according to claim 16, wherein each of the first protection circuit and the second protection circuit includes a Zener diode.

18. The power conversion apparatus according to claim 1, further comprising a switch to make a switch between supplying the first power supply voltage to the drive circuit and supplying the second power supply voltage to the drive circuit under control of the control circuit.

19. A motor module comprising:
   a motor; and
   the power conversion apparatus of claim 1.

20. An electric power steering apparatus comprising the motor module of claim 19.

* * * * *